Patented Aug. 11, 1936

2,050,558

UNITED STATES PATENT OFFICE 2,050,558

STABLE HORMONE DRY PREPARATIONS IN A SOLID CONDITION AND A PROCESS OF PREPARING THEM

Max Bockmühl and Fritz Lindner, Frankfort-on-the-Main, and Otto Schaumann, Wiesbaden, Germany, assignors to Winthrop Chemical Company Inc., New York, N. Y., a corporation of New York No Drawing. Application March 16, 1934, Serial No. 715,996. In Germany March 18, 1933

11 Claims. (Cl. 167—74)

The present invention relates to stable hormone dry preparations in a solid condition and to a process of preparing them.

Many attempts have already been made to apply hormones parenterally in the form of a dry substance. Preparations from the posterior lobes of the hypophysis have for instance been administered in diabetes insipidus in the form of a snuff. Owing to their extraordinary efficacy the hormones in question can be administered in small quantities only and consequently in highly dilected state. It is, therefore, necessary to triturate the hormones with indifferent powders. This process requires a stability of the hormones in the solid diluents in question. It has been found that the mixture of many hormones with the usual extenders, such as lactose, urea, or the like are not stable. It, therefore, has been suggested that the total glands containing the hormone or hormones should be used in a dried or pulverized condition. Indeed, for some time the total posterior lobe of the cerebral gland has been used in the dried form. This expedient, however, has the drawback that it involves the administration not only of the hormones desired for each particular case, but of the whole of the hormones and accompanying substances contained in the portion of the gland.

We have now found that stable dilutions of the hormones, such as the hormone of the posterior lobe of the hypophysis which has a tonic effect on the intestine and prevents diuresis, the blood-sugar reducing hormone of pancreas, the sexual hormone of the anterior lobe of the hypophysis can be obtained in a solid form by uniting the hormones obtained according to known methods with high-molecular, albumen-like substances, the high-molecular decomposition products thereof, such as serum albumen, gelatin, casein, the sodium salt of lysalbinic acid, the sodium salt of protalbinic acid, etc. The process is, for instance, conducted as follows: the hormones are dissolved together with the carrier substances named above in a solvent suitable for both components, such as water, dilute alkalies, for instance dilute caustic soda solution, dilute caustic potash solution, dilute sodium carbonate solution; furthermore, organic acids, such as acetic acid, formic acid or the like. The solutions thus obtained are mixed with a precipitant which will precipitate the hormones and the carrier substances. As precipitants there may be used organic solvents miscible with the solvent in the solution and in which the hormone and the carrier substance are insoluble. The separated and dried hormone preparations may be mixed in any desired manner with an extender, such as urea, lactose or the like.

The following examples serve to illustrate the invention:

(1) 20 milligrams of the pulverized hormone of the posterior lobe of the hypophysis having a tonic effect on the intestine and an action preventing diuresis and containing 100 units per milligram are dissolved in 2 cc. of glacial acetic acid. There is added a solution of 2 grams of the sodium salt of protalbinic acid in 10 cc. of glacial acetic acid and subsequently as a precipitant, a mixture of 100 cc. of acetone and 200 cc. of ether. The precipitate is centrifuged, washed with ether and dried. The dry powder is triturated with 5 times its weight of lactose.

(2) 20 milligrams of the pulverized hormone of the posterior lobe of the hypophysis having a tonic effect on the intestine and an action preventing diuresis and containing 100 units per milligram are dissolved in 2 cc. of water and the solution is mixed with 30 cc. of normal serum. The active substance is then precipitated, united with the serum albumen by the addition of a mixture of 300 cc. of absolute alcohol and 300 cc. of ether, separated, washed with ether and dried.

(3) 20 milligrams of the pulverized hormone of the posterior lobe of the hypophysis having a tonic effect on the intestine and an action preventing diuresis and containing 100 units per milligram are dissolved in 2 cc. of glacial acetic acid and the solution is mixed with a solution of 2 grams of gelatin in 10 cc. of glacial acetic acid. The active substance is precipitated, united with the gelatin by pouring the mixed solution into 300 cc. of ether, and is further treated as described in Example 2.

(4) 100 milligrams of the blood-sugar-reducing hormone of pancreas in a pure state are dissolved in 5 cc. of glacial acetic acid. The solution is mixed with a solution of 5 grams of gelatin in 25 cc. of glacial acetic acid and the hormone and gelatin are precipitated by introducing the solution, while stirring, into 1 liter of ether. The further treatment is carried out as described in Example 2.

(5) 20 milligrams of the pure preparation of the sexual hormone of the anterior lobe of the hypophysis from the urine of pregnant women are dissolved in 2 cc. of water and the solution is mixed with 30 cc. of normal serum. The active principle is then precipitated together with the serum albumen by means of a mixture of 500 cc.

of alcohol and 500 cc. of ether. The further treatment is carried out as described in Example 2.

We claim:

1. The process which comprises dissolving a hormone together with a high molecular albumen decomposition product as a carrier substance in a solvent, precipitating the hormone together with the carrier substance and drying the precipitate.

2. The process which comprises dissolving a hormone together with a high molecular albumen decomposition product as a carrier substance in a solvent, precipitating the hormone together with the carrier substance by adding an organic solvent in which both the hormone and the carrier substance are insoluble and drying the precipitate.

3. The process which comprises dissolving the hormone of the posterior lobe of the hypophysis having a tonic effect on the intestine and a diuresis-hindering action together with a high molecular albumen decomposition product as a carrier substance in a solvent, precipitating the hormone together with the carrier substance and drying the precipitate.

4. The process which comprises dissolving the hormone of the posterior lobe of the hypophysis having a tonic effect on the intestine and a diuresis-hindering action together with a high molecular albumen decomposition product as a carrier substance in a solvent, precipitating the hormone together with the carrier substance by adding an organic solvent in which both the hormone and the carrier substance are insoluble, and drying the precipitate.

5. The process which comprises dissolving the hormone of the posterior lobe of the hypophysis having a tonic effect on the intestine and a diuresis-hindering action together with the sodium salt of protalbinic acid as a carrier substance in glacial acetic acid, precipitating the hormone together with the carrier substance by adding a mixture of acetone and ether and drying the precipitate.

6. The process which comprises dissolving the hormone of the posterior lobe of the hypophysis having a tonic effect on the intestine and a diuresis-hindering action together with gelatin in glacial acetic acid, precipitating the hormone together with the carrier substance by adding ether and drying the precipitate.

7. A composition of matter comprising a hormone bound to a high molecular albumen decomposition product as a carrier substance.

8. A composition of matter comprising a hormone bound to a high molecular albumen decomposition product as a carrier substance and an indifferent extender.

9. A composition of matter comprising the hormone of the posterior lobe of the hypophysis having a tonic effect on the intestine and a diuresis-hindering action bound to a high molecular albumen decomposition product as a carrier substance.

10. A composition of matter comprising the hormone of the posterior lobe of the hypophysis having a tonic effect on the intestine and a diuresis hindering action bound to protalbinic acid.

11. A composition of matter comprising the hormone of the posterior lobe of the hypophysis having a tonic effect on the intestine and a diuresis hindering action bound to gelatin.

MAX BÖCKMÜHL.
FRITZ LINDNER.
OTTO SCHAUMANN.